(12) United States Patent  (10) Patent No.: US 8,960,019 B1
Oldham et al.  (45) Date of Patent: Feb. 24, 2015

(54) FUEL DISPENSER TIME SYNCHRONIZATION AND GEOTRACKING

(71) Applicant: Gilbarco Inc., Greensboro, NC (US)

(72) Inventors: Christopher Adam Oldham, High Point, NC (US); Juergen Voss, Borchen (DE); Joseph Daniel Long, Oak Ridge, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 14/301,451

(22) Filed: Jun. 11, 2014

(51) Int. Cl.
*G01F 1/05* (2006.01)
*G06F 1/14* (2006.01)
*G01F 1/00* (2006.01)

(52) U.S. Cl.
CPC ... *G06F 1/14* (2013.01); *G01F 1/00* (2013.01)
USPC ............ 73/861.79; 137/234.6; 375/257; 705/64

(58) Field of Classification Search
USPC .......... 73/861.74, 861.79, 861.75; 137/234.6; 375/257; 705/64; 700/236
See application file for complete search history.

(56) References Cited

U.S. PATENT DOCUMENTS

| | | | |
|---|---|---|---|
| 4,967,366 A | 10/1990 | Kaehler | |
| 4,977,528 A | 12/1990 | Norris | |
| 5,319,545 A | 6/1994 | McGarvey et al. | |
| 5,400,253 A | 3/1995 | O'Connor | |
| 5,423,457 A | 6/1995 | Nicholas et al. | |
| 5,654,718 A | 8/1997 | Beason et al. | |
| 5,663,734 A | 9/1997 | Krasner | |
| 5,678,169 A | 10/1997 | Turney | |
| 5,689,071 A | 11/1997 | Ruffner et al. | |
| 5,734,851 A | 3/1998 | Leatherman et al. | |
| 5,736,961 A | 4/1998 | Fenton et al. | |
| 5,923,572 A * | 7/1999 | Pollock | 700/282 |
| 5,956,259 A | 9/1999 | Hartsell, Jr. et al. | |
| 6,002,363 A | 12/1999 | Krasner | |
| 6,052,629 A | 4/2000 | Leatherman et al. | |
| 6,128,551 A * | 10/2000 | Davis et al. | 700/236 |
| 6,152,591 A * | 11/2000 | McCall et al. | 700/231 |
| 6,321,984 B1 * | 11/2001 | McCall et al. | 235/381 |
| 6,435,204 B2 | 8/2002 | White et al. | |
| 6,935,191 B2 * | 8/2005 | Olivier et al. | 73/861.79 |
| 7,012,856 B2 | 3/2006 | Kibiloski et al. | |
| 7,289,877 B2 | 10/2007 | Wilson | |
| 7,317,905 B2 | 1/2008 | Haefner et al. | |
| 7,333,467 B2 | 2/2008 | Kuehnle et al. | |
| 7,369,628 B2 | 5/2008 | Haefner et al. | |
| 8,433,441 B2 | 4/2013 | Oldham | |
| 8,786,272 B2 * | 7/2014 | Carapelli et al. | 324/71.1 |
| 2011/0295415 A1 | 12/2011 | Bartlett et al. | |
| 2012/0166343 A1 | 6/2012 | Carapelli et al. | |
| 2013/0121428 A1 | 5/2013 | Carapelli et al. | |

* cited by examiner

*Primary Examiner* — Jewel V Thompson
(74) *Attorney, Agent, or Firm* — Nelson Mullins Riley & Scarborough LLP

(57) ABSTRACT

A fuel dispenser has internal fuel flow piping, a flow meter located along the internal fuel flow piping, and a displacement sensor operatively connected to the flow meter to generate information representative of an amount of fuel passing through the flow meter. The fuel dispenser also has a control system comprising a memory. In embodiments, however, the control system does not comprise a real-time clock. The fuel dispenser also comprises a synchronization module in electronic communication with the control system. The synchronization module comprises at least one antenna configured to receive a carrier wave modulated with synchronization information. Methods for obtaining accurate time information at the fuel dispenser are also disclosed.

24 Claims, 8 Drawing Sheets

FUEL DISPENSER TIME SYNCHRONIZATION AND GEOTRACKING

FIELD OF THE INVENTION

The present invention relates generally to fuel dispensers and fueling environments. More specifically, embodiments of the invention provide systems and methods for providing accurate date and time information in and geotracking of various control systems in a fueling environment, including but not limited to fuel dispenser and site controller control systems, using a synchronization module.

BACKGROUND

Various jurisdictions have regulations which require certain components within a fueling environment (such as a fueling forecourt) to keep complete logs of pertinent data for auditing by the appropriate authority. Examples of components for which logs may be required include site automation systems, point-of-sale (POS) systems, and fuel dispenser control systems. The logs may keep track of configuration changes, times at which the system was accessed, sensor readings, times of last calibration, and price changes, among others. Notably, it is also necessary to keep highly accurate records of the time at which each log entry occurred.

However, accurate timekeeping is difficult for a variety of reasons. Currently, for example, components for which logs are required keep time using a real-time clock (RTC). RTCs are typically in the form of an integrated circuit and include an independent power source, such as a battery, so that RTCs can keep the time even while a component is turned off. Time is kept at the component by the operating system (OS) or real-time OS (RTOS) of the component periodically reading from the RTC using interrupt service routines. Unfortunately, however, RTCs are prone to drift over time. Moreover, the time kept by the component's OS or RTOS may also drift away from the time kept by the RTC during intervals between readings from the RTC. This causes complex algorithms to attempt to refresh the OS or RTOS time by reading from the RTC more frequently, which can be time consuming and inefficient.

Clocks which can synchronize themselves using radio transmissions ("radio clocks" or "radio-controlled clocks") are also known. In particular, certain radio transmitters may transmit signals modulated with a time code which identifies the current time (e.g., year, month, day, hour, minute, seconds, etc.) in a particular jurisdiction or in Coordinated Universal Time (UTC). One example of such a radio transmitter is the WWVB National Institute of Standards and Technology radio station near Fort Collins, Colo. The radio transmitters themselves may obtain the current time from a time standard, such as an atomic clock. A radio clock tuned to the frequency of the transmitter receives and decodes the time code modulated onto the carrier wave of the radio transmitter. Accordingly, the radio clock can thereby set or update its clock with the current time. Where the time code is in UTC, the radio clock is programmed to apply time zone and daylight savings time offsets, as applicable, for a particular jurisdiction. In general, radio clocks can obtain accuracy at least within a hundredth of a second relative to the time standard.

Satellite navigation receivers which communicate with Global Navigation Satellite Systems (GNSS) are also known. These receivers include antennas which receive signals from GNSS satellites which enable the receivers to obtain accurate information regarding the current time and the location of the receiver. Examples of GNSS include the United States' Global Positioning System (GPS), Russia's GLONASS, and Europe's GALILEO. Other GNSS are currently being developed by India, China, and Japan. Time information obtained by satellite navigation receivers is very accurate, in some cases within 100 nanoseconds of the atomic clocks carried by the satellites.

SUMMARY

The present invention recognizes and addresses various considerations of prior art constructions and methods. According to one aspect, the present invention provides a method for obtaining accurate time information at a fuel dispenser. The method comprises the steps of providing a synchronization module in electronic communication with a control system of a fuel dispenser. The control system in operative communication with hydraulics of the fuel dispenser and comprises a memory. The control system further comprises an operating system which maintains a first time. The method also comprises receiving at the synchronization module a carrier wave modulated with synchronization information and generating at the synchronization module information representative of a second time. Finally, the method comprises transmitting the information representative of the current time to the control system.

According to another aspect, the present invention provides a fuel dispenser comprising internal fuel flow piping, a flow meter located along the internal fuel flow piping, and a displacement sensor operatively connected to the flow meter to generate information representative of an amount of fuel passing through the flow meter. The fuel dispenser also comprises a control system comprising a memory, wherein the control system does not comprise a real-time clock. Additionally, the fuel dispenser comprises a synchronization module in electronic communication with the control system. The synchronization module comprises at least one antenna configured to receive a carrier wave modulated with synchronization information.

In yet another aspect, the present invention provides a method for obtaining accurate time information at a fuel dispenser. The method comprises providing a control system located in the fuel dispenser, the control system comprising a memory and software which maintains a first time. The control system further comprises a synchronization module. The synchronization module comprises at least one antenna configured to receive a carrier wave modulated with synchronization information. The method also comprises receiving the carrier wave and generating information representative of a second time. Finally, the method comprises synchronizing the first time with the second time.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
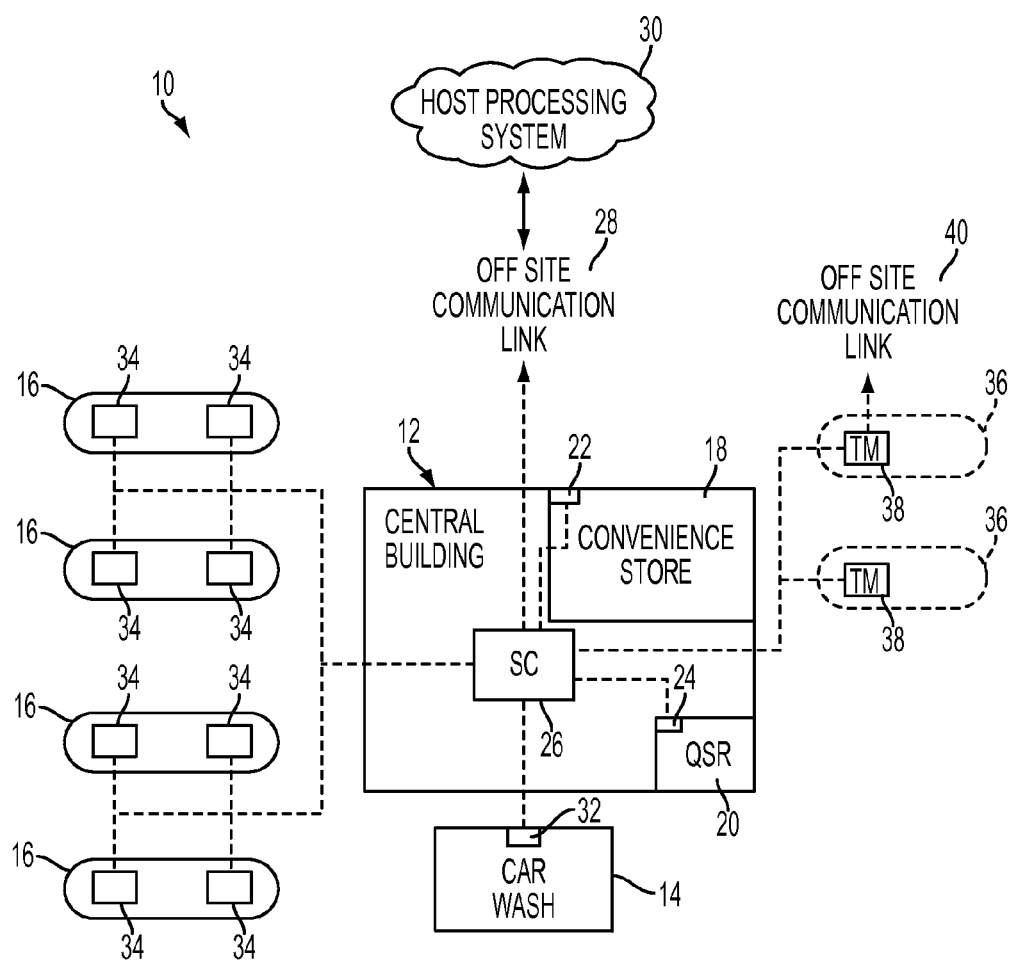
FIG. 1 is a diagrammatic representation of a retail fueling environment in which an embodiment of the present invention may be utilized.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Some embodiments of the present invention may be particularly suitable for use with a fuel dispenser in a retail service station environment, and the below discussion will describe some preferred embodiments in that context. However, those of skill in the art will understand that the present invention is not so limited. In fact, it is contemplated that embodiments of the present invention may be used with any control system in a fueling environment or another suitable retail environment. For example, embodiments of the present invention may also be used with control systems of payment system devices, including CRIND modules, points of sale (POS), PIN pads, card readers, and payment terminals; site automation systems; tank monitors and automated tank gauges; compliance modules; media and merchandising systems; and forecourt controllers, among others. Moreover, embodiments of the present invention may be used with other types of fluid dispensers, including diesel exhaust fluid (DEF) dispensers, compressed natural gas (CNG) dispensers, and liquefied petroleum gas (LPG) and liquid natural gas (LNG) applications, among others.

Referring now to FIG. 1, an exemplary fueling environment 10 may comprise a central building 12, a car wash 14, and a plurality of fueling islands 16. The central building 12 need not be centrally located within the fueling environment 10, but rather is the focus of the fueling environment 10, and may house a convenience store 18 and/or a quick serve restaurant 20 therein. Both the convenience store 18 and the quick serve restaurant 20 may include POS 22, 24, respectively. POS 22, 24 may comprise a single computer or server operatively connected to an associated card reader and payment terminal. Additionally, POS 22, 24 may include a display, a touch screen, and/or other input devices.

The central building 12 may further house a site controller (SC) 26, which in an exemplary embodiment may be the PASSPORT® POS system, sold by Gilbarco Inc. of Greensboro, N.C., although third party site controllers may be used. Site controller 26 may control the authorization of fueling transactions and other conventional activities as is well understood, and site controller 26 may preferably be in operative communication with each POS. Alternatively, site controller 26 may be incorporated into a POS, such as point of sale 22 if needed or desired. In other embodiments, site controller 26 may comprise a site automation system and/or a forecourt controller, such as the PSS 5000 Forecourt Controller offered by DOMS ApS of Glostrup, Denmark; the PCC offered by The POSTEC Company of Auckland, New Zealand; the Enhanced Dispenser Hub offered by Gilbarco Inc.; and the Pump Access Module offered by Gilbarco Inc.

Further, site controller 26 may have an off-site communication link 28 allowing communication with a remote host processing system 30 for credit/debit card authorization, content provision, reporting purposes or the like, as needed or desired. In one embodiment, communication link 28 may be a stand alone router, switch, or gateway, although it should be appreciated that site controller 26 may additionally perform the functions of, and therefore replace, such a device. The off-site communication link 28 may be routed through the Public Switched Telephone Network (PSTN), the Internet, both, or the like, as needed or desired. Remote host processing system 30 may comprise at least one server maintained by a third party, such as a financial institution. Although only one remote host processing system 30 is illustrated, those of skill in the art will appreciate that in a retail payment system allowing payment via payment devices issued by multiple payment card companies or financial institutions, site controller 26 may be in communication with a plurality of remote host processing systems 30. Moreover, by way of off-site communication link 28, site controller 26 may be in wired or wireless communication with a remote diagnostics "cloud" service, similar to the On Star® system on General Motors vehicles, such that information from components in fueling environment 10 may be then provided to the cloud service for storage and analysis.

Car wash 14 may have a POS 32 associated therewith that communicates with site controller 26 for inventory and/or sales purposes. Car wash 14 alternatively may be a stand alone unit. Note that car wash 14, convenience store 18, and quick serve restaurant 20 are all optional and need not be present in a given fueling environment.

Fueling islands 16 may have one or more fuel dispensers 34 positioned thereon. Fuel dispensers 34 may be, for example, the ENCORE® sold by Gilbarco Inc. of Greensboro, N.C. Fuel dispensers 34 are in electronic communication with site controller 26 through any suitable link, such as two wire, RS 422, Ethernet, wireless, etc. if needed or desired.

Fueling environment 10 also has one or more underground storage tanks (USTs) 36 adapted to hold fuel therein. As such, USTs 36 may each be a double walled tank. Further, each UST 36 may include a tank monitor (TM) 38 associated therewith. Tank monitors 38 may communicate with fuel dispensers 34 (either through site controller 26 or directly, as needed or desired) to determine amounts of fuel dispensed and compare fuel dispensed to current levels of fuel within USTs 36 to determine if USTs 36 are leaking.

Tank monitor 38 may communicate with site controller 26 and further may have an off-site communication link 40 for leak detection reporting, inventory reporting, or the like. Much like off-site communication link 28, off-site communication link 40 may be through the PSTN, the Internet, both, or the like. If off-site communication link 28 is present, off-site communication link 40 need not be present and vice versa, although both links may be present if needed or desired.

Further information on and examples of fuel dispensers and retail fueling environments are provided in U.S. Pat. No. 6,435,204 (entitled "Fuel Dispensing System"); U.S. Pat. No. 5,956,259 (entitled "Intelligent Fueling"); U.S. Pat. No. 5,734,851 (entitled "Multimedia Video/Graphics in Fuel Dispensers"); U.S. Pat. No. 6,052,629 (entitled "Internet Capable Browser Dispenser Architecture"); U.S. Pat. No. 5,689,071 (entitled "Wide Range, High Accuracy Flow Meter"); U.S. Pat. No. 6,935,191 (entitled "Fuel Dispenser Fuel Flow Meter Device, System and Method"); and U.S. Pat. No. 7,289,877 (entitled "Fuel Dispensing System for Cash Customers"), all of which are hereby incorporated by reference in their entireties for all purposes. An exemplary tank monitor 38 may be the TLS-450 manufactured and sold by the Veeder-Root Company of Simsbury, Conn. For more information about tank monitors and their operation, reference is made to U.S. Pat. No. 5,423,457 (entitled "Real time tank product loss detection system"); U.S. Pat. No. 5,400,253 (entitled "Automated Statistical Inventory Reconciliation System for Convenience Stores and Auto/truck Service Stations"); U.S. Pat. No. 5,319,545 (entitled "System to Monitor Multiple Fuel Dispensers and Fuel Supply Tank"); and U.S. Pat. No. 4,977,528 (entitled "Apparatus and Method for Determining the Amount of Material in A Tank"), all of which are hereby incorporated by reference in their entireties for all purposes.

Figure 2:
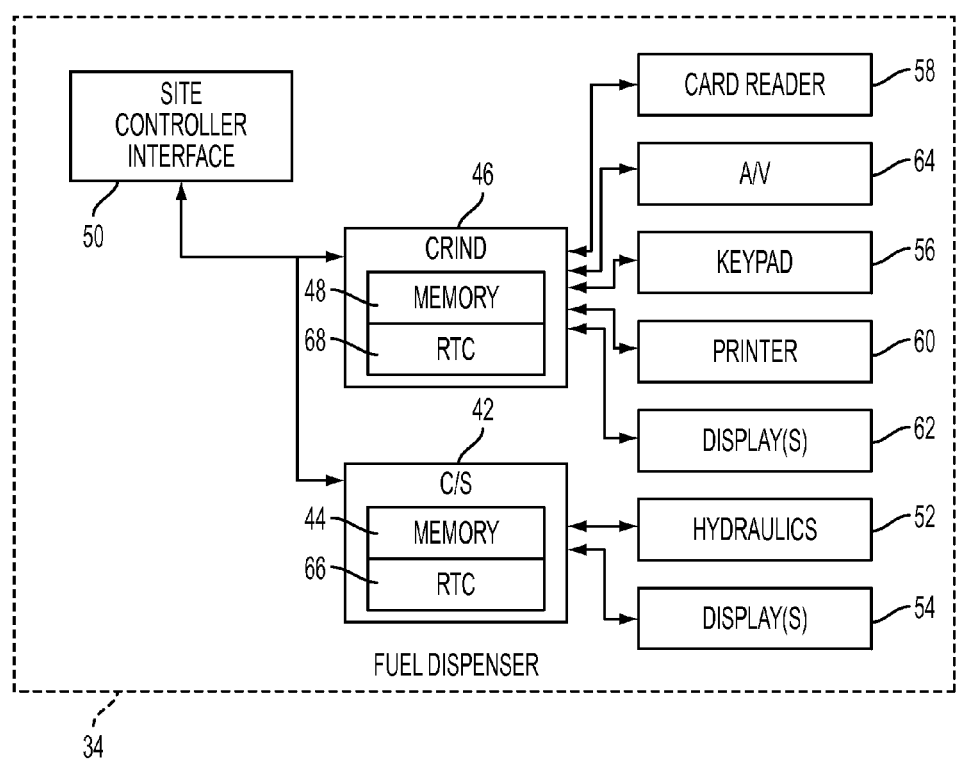
FIG. 2 is a block diagram of the electronics of a fuel dispenser used in the retail fueling environment of FIG. 1.

FIG. 2 is a block diagram of the electronics of fuel dispenser 34. Dispenser 34 includes a control system 42, which may be a processor, microprocessor, controller, microcontroller, or other suitable electronics with associated memory 44 and software programs running thereon. Preferably, dispenser control system 42 is comparable to the microprocessor-based control systems present in dispensers sold by Gilbarco Inc. under the trademark ENCORE®. The memory 44 of control system 42 may be any memory or computer-readable medium as long as it is capable of being accessed by the control system, including random access memory (RAM), read-only memory (ROM), erasable programmable ROM (EPROM), or electrically EPROM (EEPROM), CD-ROM, DVD, or other optical disk storage, solid-state drive (SSD), magnetic disc storage, including floppy or hard drives, any type of non-volatile memories, such as secure digital (SD), flash memory, memory stick, or any other medium that may be used to carry or store computer program code in the form of computer-executable programs, instructions, or data. Control system 42 may also include a portion of memory 44 accessible only to control system 42.

In addition, dispenser 34 may also comprise a CRIND (card reader in dispenser) module 46. Those of ordinary skill in the art are familiar with CRIND units used in fuel dispensers, but additional background information is provided in U.S. Pat. No. 4,967,366, the entirety of which is incorporated by reference herein for all purposes. In a preferred embodiment, CRIND module 46 is comparable to the microprocessor-based control systems used in CRIND and TRIND (tag or transponder reader in dispenser) type units sold by Gilbarco Inc. CRIND module 46 may have a memory 48 analogous to memory 44 described above.

As shown, control system 42 and CRIND module 46 are in operative communication with site controller 26 via an interface 50. In addition, although not specifically shown in FIG. 2, either or both of control system 42 and CRIND module 26 may be in wired or wireless communication with the Internet and/or one or more cloud servers via off-site communication link 28 (FIG. 1) or another suitable communication link.

Control system 42 includes the hardware and software necessary to control the hydraulic components and functions of dispenser 34. Those of ordinary skill in the art are familiar with the operation of the hydraulics 52 of dispenser 34. In general, however, fuel from USTs 36 is pumped through a piping network into an inlet pipe. Fuel being dispensed passes though a flow meter, which is responsive to flow rate or volume. A displacement sensor, such as a pulser, is employed to generate a signal in response to fuel flow though the meter and communicate this information to control system 42. Control system 42 may also provide control signaling to a valve that may be opened and closed to permit or not permit dispensing of fuel.

Meter flow measurements from the displacement sensor are collected by control system 42. Control system 42 also typically performs calculations such as cost associated with a fuel dispensing transaction. As a dispensing transaction progresses, fuel is then delivered to a hose and through a nozzle into the customer's vehicle. Dispenser 34 includes a nozzle boot, which may be used to hold and retain the nozzle when not in use. The nozzle boot may include a mechanical or electronic switch in communication with control system 42 to indicate when the nozzle has been removed for a fuel dispensing request and when the nozzle has been replaced, signifying the end of a fueling transaction. Control system 42 may thus determine whether a transaction has been initiated or completed.

Control system 42 may further be operative to control one or more displays 54. For example, a transaction price total display may present customers with the price for fuel that is dispensed. A transaction gallon total display may be used to present customers with the measurement of fuel dispensed in units of gallons or liters. Finally, price per unit (PPU) displays may be provided to show the price per unit of fuel dispensed in either gallons or liters, depending on the programming of dispenser 34.

Next, CRIND module 46 includes the hardware and software necessary to support payment processing and peripheral interfaces at dispenser 34. In this regard, CRIND module 46 may be in operative communication with several input devices. For example, a keypad 56 is typically used for entry of a PIN if the customer is using a debit card for payment of fuel or other goods or services. In a preferred embodiment, keypad 56 may be the FlexPay™ encrypting PIN pad offered by Gilbarco Inc.

CRIND module 46 may also be in operative communication with a secure card reader 58 for accepting credit, debit, or other magnetic stripe cards for payment. Additionally, secure card reader 58 may accept loyalty or program-specific cards as is well known. Card reader 58 comprises a mechanism for receiving payment card data, such as a read head in the case of a magnetic stripe card reader, as well as at least one input-output ("I/O") port for receiving and loading the encryption keys of the first encryption method. In presently preferred embodiments, card reader 58 may be analogous to the MagTek® PermaSeal secure card reader or the FlexPay™ secure card reader offered by Gilbarco Inc. In other embodiments, card reader 58 may be a contactless card reader (e.g., for integrated circuit or "smart" cards). Further, CRIND module 46 may be in operative communication with other payment or transactional devices such as a receipt printer 60.

One or more display(s) 62 may be used to display information, such as transaction-related prompts and advertising, to the customer. The customer may use soft keys to respond to information requests presented to the user via a display 62. In some embodiments, however, a touch screen may be used for a display 62. In this case, display 62 may be configured to display a virtual keypad for receiving payment data such as a PIN of a debit card or the billing zip code of a credit card, for instance. A display 62 may also be used to receive a selection from the customer regarding the displayed information.

Accordingly, CRIND module 46 may provide a graphical user interface with keypad 56 and/or display(s) 62. Audio/video electronics 64 are adapted to interface with the CRIND module 46 and/or an auxiliary audio/video source to provide advertising, merchandising, and multimedia presentations to a customer in addition to basic transaction functions. The graphical user interface provided by the dispenser may allow customers to purchase goods and services other than fuel at the dispenser. For example, the customer may purchase a car wash and/or order food from the store 18 while fueling a vehicle.

Finally, control system 42 and CRIND module 46 may each include an RTC 66, 68, respectively. Control system 42 and CRIND module 46 may periodically read from their respective RTCs to set or reset the time of their associated OSes or RTOSes. As explained above, however, there are a number of drawbacks with this approach to keeping time, including drift of the RTC time itself and drift of the OS or RTOS time from the time kept by the RTC. Accordingly, embodiments of the present invention provide systems and methods for providing accurate date and time information in control systems in a fueling environment using a synchronization module, such as a radio clock.

Figure 3:
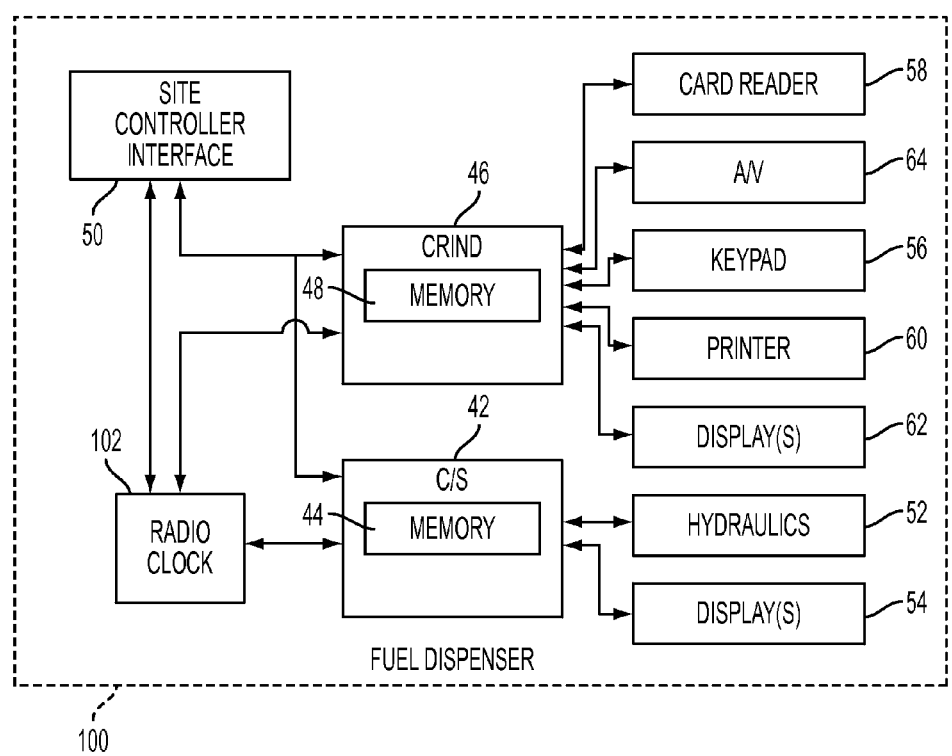
FIG. 3 is a block diagram of the electronics of a fuel dispenser in accordance with an embodiment of the present invention.

Turning now to FIG. 3, a block diagram of the electronics of a fuel dispenser 100 is shown according to an embodiment of the present invention. The electronics of fuel dispenser 100 may be in many respects analogous to the electronics of fuel dispenser 34, described in detail above. In this embodiment, however, the electronics of fuel dispenser 100 preferably comprises a synchronization module, here radio clock module 102. Further, in this embodiment, no RTCs are included in either control system 42 or CRIND module 46.

Radio clock module 102 may preferably be in electronic communication with both control system 42 and CRIND module 46. In addition, radio clock module 102 may be in electronic communication with site controller 26 via site controller interface 50. As shown in FIG. 3, radio clock module 102 may be a "plug-in" component, i.e., connected by a suitable communications medium (including cables or wireless communications) to one or all of these control systems. However, it will be appreciated that, in other embodiments, radio clock module 102 may be incorporated into one of these control systems. In such a case, radio clock module 102 may then be in electronic communication with other control systems in the fueling environment. Further, more than one radio clock module 102 may be present in some embodiments.

Radio clock module 102 preferably comprises an antenna tuned to the frequency of a radio transmitter which transmits a carrier wave modulated with a time code identifying the current time (e.g., year, month, day, hour, minute, seconds, etc.), either in the jurisdiction in which fuel dispenser 100 is located, in UTC, or in another suitable time format. Radio clock module 102 may further comprise a processor in communication with associated memory. In one embodiment, the time code received by the antenna of radio clock module 102 may be demodulated from the carrier wave at a radio stage of module 102 and then passed to a time signal decoder, which may decode the time code. Depending on the configuration of radio module 102, it may then pass information representative of the current time to the processor, which may communicate this information to control system 42, CRIND module 46, and/or site controller 26. Further, the processor of radio clock module 102 may also store some or all of this information in memory and/or set or update its clock (where included) with the current time. Depending on the format of the time code, radio clock module 102 is preferably programmed to apply time zone and daylight savings time offsets, as applicable, for the jurisdiction in which fuel dispenser 100 is located. Preferably, the tuning of radio clock module 102 may be modified by appropriate personnel or by another control system, such as control system 42 or site controller 26. Those of skill in the art are familiar with radio clock modules 102 which may be adapted for use in embodiments of the present invention, but additional background regarding radio clocks is provided in U.S. Pat. Nos. 7,012,856; 7,317,905; 7,333,467; 7,369,628, each of which is incorporated by reference herein in its entirety for all purposes.

Synchronization of radio clock module 102 may be under control of one or more control systems, or may occur independently. Thus, for example, the OS or RTOS of control system 42, CRIND module 46, and/or site controller 26 may periodically instruct radio clock module 102 to perform synchronization and, after synchronization has occurred, obtain the current time from radio clock module 102. Thereby, control system 42, CRIND module 46, and/or site controller 26 may refresh the time kept by their respective OS or RTOS. In one embodiment, one or more of these control systems may instruct synchronization to occur each time fuel dispenser 100 or the control systems themselves are restarted. Alternatively, one of these control systems may simply communicate with or read from radio clock module 102 periodically, knowing that radio clock module 102 will have synchronized itself recently.

Correspondingly, in some embodiments, radio clock module 102 may continuously receive time code information and update its clock and/or store the current time in memory. In other embodiments, radio clock module 102 may synchronize itself with the radio transmitter and update its clock and/or store the current time in memory periodically, such as every 24 hours. In still other embodiments, radio clock module 102 may only perform synchronization when instructed by a particular control system's OS or RTOS.

Figure 4:
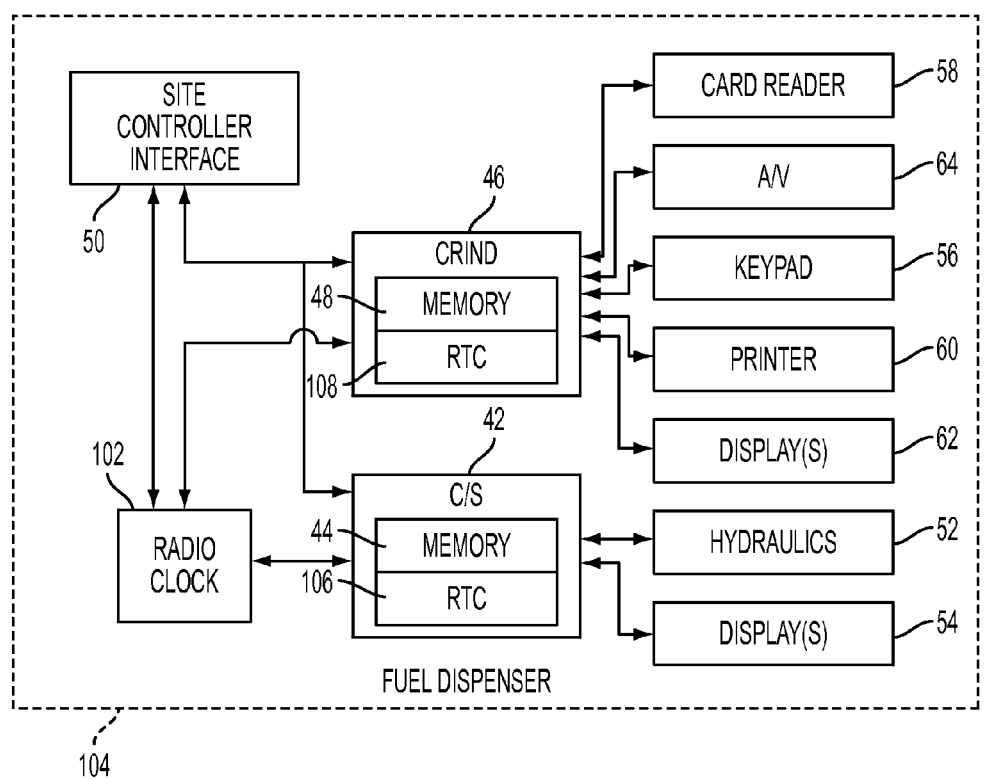
FIG. 4 is a block diagram of the electronics of a fuel dispenser in accordance with another embodiment of the present invention.

FIG. 4 is a block diagram of the electronics of a fuel dispenser 104 in accordance with another embodiment of the present invention. Again, the electronics of fuel dispenser 104 may be in many respects analogous to the electronics of fuel dispenser 34, described in detail above. Further, the electronics of fuel dispenser 104 again preferably comprises a radio clock module 102. In this embodiment, however, control system 42 and CRIND module 46 of fuel dispenser 104 retain RTCs 106, 108, respectively, which are present in prior art systems.

The operation of fuel dispenser 104 is likewise similar to that of fuel dispenser 100, described above. In this case, however, synchronization of radio clock module 102 is used to update not just the time kept by the respective OS or RTOS of control system 42, CRIND module 46, and/or site controller 26 but also the time kept by RTCs 106 and 108. Again, synchronization of radio clock module 102 may occur independently, either continuously or periodically, and control system 42, CRIND module 46, and/or site controller 26 may periodically communicate with or read from radio clock module 102 to update the time kept by their respective OS or RTOS and their respective RTCs 106, 108. Alternatively, synchronization of radio clock module 102 may occur as instructed by one of these control systems, which may then use the current time information received from radio clock module 102 to update the time kept by their respective OS or RTOS and/or their respective RTCs 106, 108.

In addition to providing accurate time information, a synchronization module may be used in embodiments of the present invention for providing accurate location information in control systems in a fueling environment. As described in more detail below, such location information may be used in various geotracking applications, among others.

Figure 5:
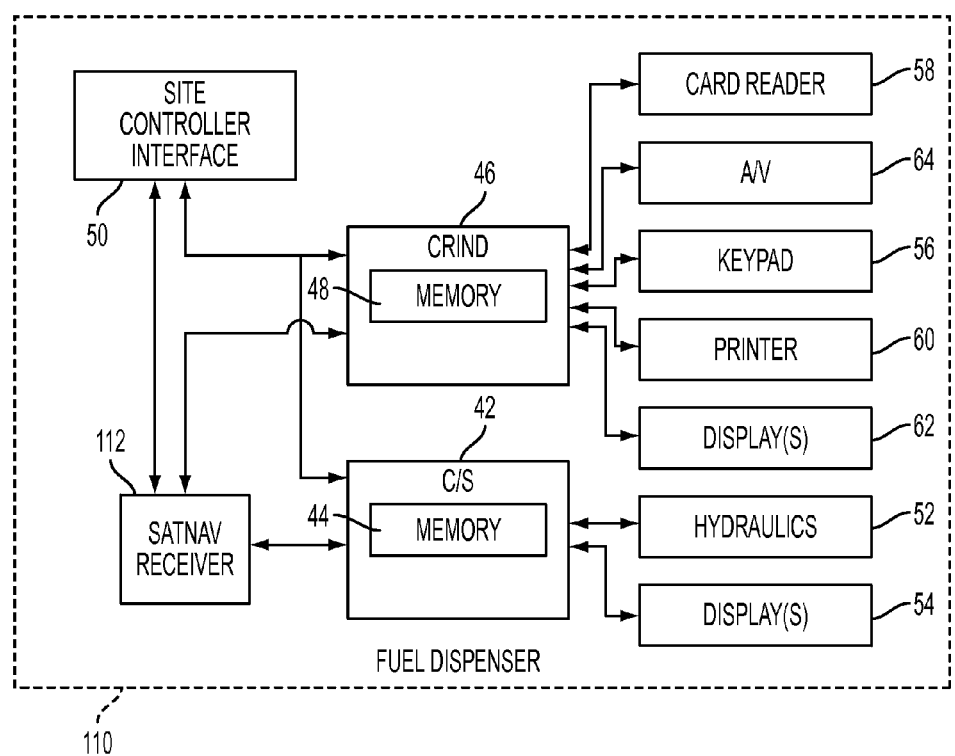
FIG. 5 is a block diagram of the electronics of the fuel dispenser of FIG. 3 in accordance with yet another embodiment of the present invention.

In this regard, FIG. 5 is a block diagram of the electronics of a fuel dispenser 110 in accordance with another embodiment of the present invention. As with fuel dispensers 100 and 104, the electronics of fuel dispenser 110 may be in many respects analogous to the electronics of fuel dispenser 34, described in detail above. In this embodiment, fuel dispenser 110 preferably comprises a synchronization module in the form of a satellite navigation (SATNAV) receiver 112. Further, in this embodiment, no RTCs are included in either control system 42 or CRIND module 46.

Satellite navigation receiver 112 may preferably be in electronic communication with both control system 42 and CRIND module 46. In addition, satellite navigation receiver 112 may be in electronic communication with site controller 26 via site controller interface 50. As shown in FIG. 5, satellite navigation receiver 112 may be a "plug-in" component, i.e., connected by a suitable communications medium (including cables or wireless communications) to one or all of these control systems. However, it will be appreciated that, in other embodiments, satellite navigation receiver 112 may be incorporated into one of these control systems. In such a case, satellite navigation receiver 112 may then be in electronic communication with other control systems in the fueling environment. Further, more than one satellite navigation receiver 112 may be present in some embodiments.

Satellite navigation receiver 112 may preferably be configured to receive signals sent from any multiple-satellite based positioning system. For example, receiver 112 may be configured to receive signals from satellites of a GNSS, such as GPS, GLONASS, and GALILEO, among others. In one preferred embodiment, satellite navigation receiver 112 may be configured to receive signals from GPS satellites, based on which receiver 112 may determine its precise location (e.g., in longitude and latitude or another location format) and synchronize its clock with the atomic clocks carried by the GPS satellites. Satellite navigation receiver 112 is preferably configured to compensate for shifts in daylight savings time, where applicable in the jurisdiction where it is located. Those of skill in the art are familiar with commercially available GPS receivers which may be modified for use with embodiments of the present invention. However, general background regarding GPS receivers is provided in U.S. Pat. Nos. 5,654,718; 5,663,734; 5,678,169; 5,736,961; and 6,002,363, each of which is incorporated by reference herein in its entirety for all purposes.

As with radio clock module 102 described above, synchronization of satellite navigation receiver 112 may be under control of one or more control systems, or may occur independently. Thus, for example, the OS or RTOS of control system 42, CRIND module 46, and/or site controller 26 may periodically instruct satellite navigation receiver 112 to perform synchronization and, after synchronization has occurred, obtain at least the current time and location information from satellite navigation receiver 112. Thereby, control system 42, CRIND module 46, and/or site controller 26 may refresh the time kept by their respective OS or RTOS.

Moreover, because satellite navigation receiver 112 may provide accurate location information during each synchronization, these control systems may also store this location information in memory. As described in more detail below, this location information may be used in geotracking applications and/or in various logs. In one embodiment, one or more of these control systems may instruct synchronization to occur each time fuel dispenser 110 or the control systems themselves are restarted. Alternatively, one of these control systems may simply communicate with or read from satellite navigation receiver 112 periodically, knowing that satellite navigation receiver 112 will have synchronized itself recently.

Correspondingly, in some embodiments, satellite navigation receiver 112 may continuously receive GPS signals and update its clock and/or store the current time and its location in memory. In other embodiments, satellite navigation receiver 112 may synchronize itself with the GPS satellites and update its clock and/or store the current time and its location in memory periodically, such as every 24 hours. In still other embodiments, satellite navigation receiver 112 may only perform synchronization when instructed by a particular control system's OS or RTOS.

Figure 6:
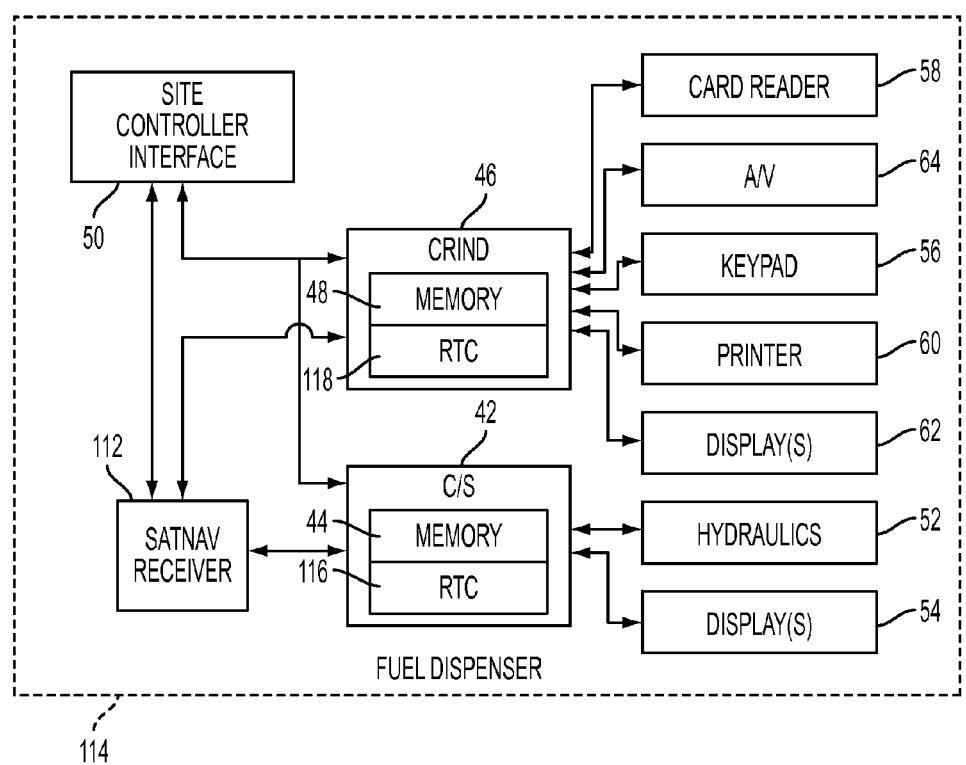
FIG. 6 is a block diagram of the electronics of the fuel dispenser of FIG. 4 in accordance with a further embodiment of the present invention.

FIG. 6 is a block diagram of the electronics of a fuel dispenser 114 in accordance with another embodiment of the present invention. Again, the electronics of fuel dispenser 114 may be in many respects analogous to the electronics of fuel dispenser 34, described in detail above. Further, the electronics of fuel dispenser 114 again preferably comprises a satellite navigation receiver 112. In this embodiment, however, control system 42 and CRIND module 46 of fuel dispenser 114 retain RTCs 116, 118, respectively, which are present in prior art systems.

The operation of fuel dispenser 114 is likewise similar to that of fuel dispenser 110, described above. In this case, however, synchronization of satellite navigation receiver 112 is used to update not just the time kept by the respective OS or RTOS of control system 42, CRIND module 46, and/or site controller 26 but also the time kept by RTCs 116 and 118. Again, synchronization of satellite navigation receiver 112 may occur independently, either continuously or periodically, and control system 42, CRIND module 46, and/or site controller 26 may periodically communicate with or read from satellite navigation receiver 112 to update the time kept by their respective OS or RTOS, to update the time kept by their respective RTCs 116, 118, and to obtain location information. Alternatively, synchronization of satellite navigation receiver 112 may occur as instructed by one of these control systems, which may then use the current time information received from satellite navigation receiver 112 to update the time kept by their respective OS or RTOS and/or their respective RTCs 116, 118. These control systems may also instruct synchronization of satellite navigation receiver 112 to update their location and store it in memory, as described above.

Figure 7:
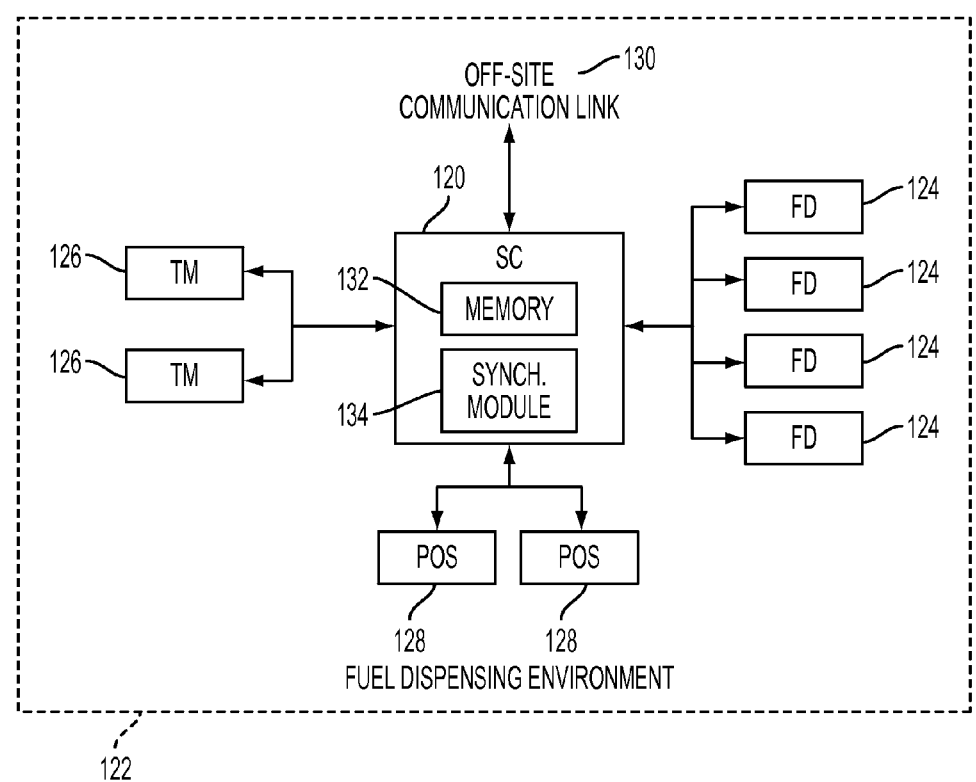
FIG. 7 is a block diagram of the electronics of a site controller in accordance with another embodiment of the present invention.

FIG. 7 is a block diagram of the electronics of a site controller 120 in a fueling environment 122 in accordance with another embodiment of the present invention. Fueling environment 122 may be in many respects analogous to fueling environment 10, described above, and thus it may comprise a plurality of fuel dispensers 124, a plurality of tank monitors 126 associated with USTs, a plurality of POSes 128, and an off-site communication link 130. As shown, site controller 120 is preferably in electronic communication with each of these components of fueling environment 122 via a suitable wired or wireless communications medium.

Site controller 120 may be analogous to site controller 26, described above, but modified in accordance with embodiments of the present invention. In one embodiment, for example, site controller may comprise a memory 132 and a synchronization module 134. In various embodiments, synchronization module 134 may be any of the synchronization modules described previously, such as radio clock module 102 or satellite navigation receiver 112. As shown in FIG. 7, synchronization module 134 may be incorporated into site controller 120, but in other embodiments it may also be a "plug-in" component, i.e., connected by a suitable communications medium (including cables or wireless communications) to site controller 120. Also as described above, in various embodiments, site controller 120 need not have an RTC, though in some embodiments it may.

Notably, site controller 120 may use synchronization module 134 to update the time kept by its OS or RTOS (and that of its RTC, where provided) in a manner similar to that described above with respect to fuel dispensers 100, 104, 110, and 114. Where synchronization module 134 comprises a satellite navigation receiver, site controller 120 may also use synchronization module 134 to update its precise location in a manner similar to that described above with respect to fuel dispensers 110 and 114. Again, synchronization of synchronization module 134 may occur independently, either continuously or periodically, and site controller 120 may periodically communicate with or read from synchronization module 134 to update the time kept by its OS or RTOS, to update the time kept by its RTC (if provided), and to obtain location information. Site controller may also store this information in memory 132. Alternatively, synchronization of synchronization module 134 may occur as instructed by site controller 120, which may then use the current time information received from synchronization module 134 to update the time kept by its OS or RTOS and/or its RTC (if provided). Site controller 120 may also instruct synchronization module 134 to update its location and communicate this information to site controller 120, which may store the location in memory 132, as described above.

Moreover, site controller 120 may also use synchronization module 134 to update the time kept by the OS or RTOS and/or the RTC (if provided) of any other control system in fueling environment 122. For example, after synchronization of synchronization module 134 has occurred, information representative of the current time may be transmitted to site controller 120, which may then transmit it to the control system and/or CRIND module of fuel dispensers 124. The control system or CRIND module of fuel dispensers 124 may then use this information to update the time kept by their OS or RTOS and/or their respective RTCs. Site controller 120 may follow the same process to transmit current time information to tank monitors 126, POSes 128, or any other control system, as needed or desired. These control systems may then use the current time information to update the time kept by their software and/or RTCs. Similarly, where synchronization module 134 comprises a satellite navigation receiver, site controller 120 may also use synchronization module 134 to update the general location of any other control system in fueling environment 122 in the same manner.

It will be appreciated that, in still other embodiments, a synchronization module may be used as described above with any other control system in a fueling environment. For example, it is contemplated that synchronization module may be in electronic communication with or incorporated in tank monitors 126 and/or POSes 128.

In any of the embodiments described above with reference to FIGS. 3-7, it is also contemplated that certain persons, including customers, auditors, or service personnel, may be able to view the time currently kept at a control system in a fueling environment. This may allow a person to verify that the time kept at the control system accurately reflects the local time at the control system, including any offset for daylight savings time, where appropriate. For example, the current time may be displayed on one of the display(s) 54, 62 described above at a fuel dispenser 100, 104, 110, 114. Alternatively, another display in communication with either CRIND 46 or control system 42 may be provided for this purpose. Further, in another embodiment the current time may be visible only to auditors or service personnel, such as by entering an appropriate authorization code on a manager's keypad located within the fuel dispenser's electronics compartment. The current time may be displayed on one of the display(s) 54, 62 described above at a fuel dispenser 100, 104, 110, 114, or it may be displayed on a separate internal display that is not visible to customers. In another embodiment, a switch (such as a magnet read or radio frequency switch), button, or the like may be provided internal to the fuel dispenser electronics compartment which enables the auditors or service personnel to view the current time on an internal display. Thus, embodiments of the present invention provide easy-to-access time information for auditors, inspectors, and service personnel.

Additionally, embodiments of the present invention may improve or enhance logging, service of components in the fueling environment, and cloud-based applications which use information transmitted from components in the fueling environment. Because control systems in the fueling environment will keep accurate time with embodiments of the present invention, the event logs produced by these control systems will reflect accurate timing of the events. Further, where information from any of the control systems described above is transmitted to the cloud for service analytics, remote monitoring and control, or the like, the information may be time-stamped with the accurate time.

Moreover, where a synchronization module used in embodiments of the present invention comprises a satellite navigation receiver, location information received from the satellites may be useful in many geotracking applications. For example, location information may be stored in the memory of the control system and/or CRIND module and may thus be used to track the movement of control boards from dispenser to dispenser and site to site. Likewise, location information may be used to track dispensers that are having problems with site maps.

In a further embodiment, location information associated with control systems and other components in a fueling environment may be used to obtain historical or future weather information for specific geographical areas, which may be used for various site analytics. More particularly, information regarding the precise location of control systems in a fueling environment may be transmitted to a cloud server or a remote system along with other information associated with the control systems, such as fuel dispenser usage times, volume dispensed, the number of transactions, the price of fuel, etc. A geotracking application may obtain weather information for the geographic area in which the control system is located based on the location obtained from the satellite navigation receiver. This weather information may be correlated, for example, with dispenser use patterns or POS transaction times, for analysis by a user of the geotracking application. For instance, the analysis could show the effect of weather on the number of transactions or on fuel dispenser use, which may inform the user regarding efficiencies which could be developed or increases or decreases in fuel prices which would be beneficial.

Figure 8:
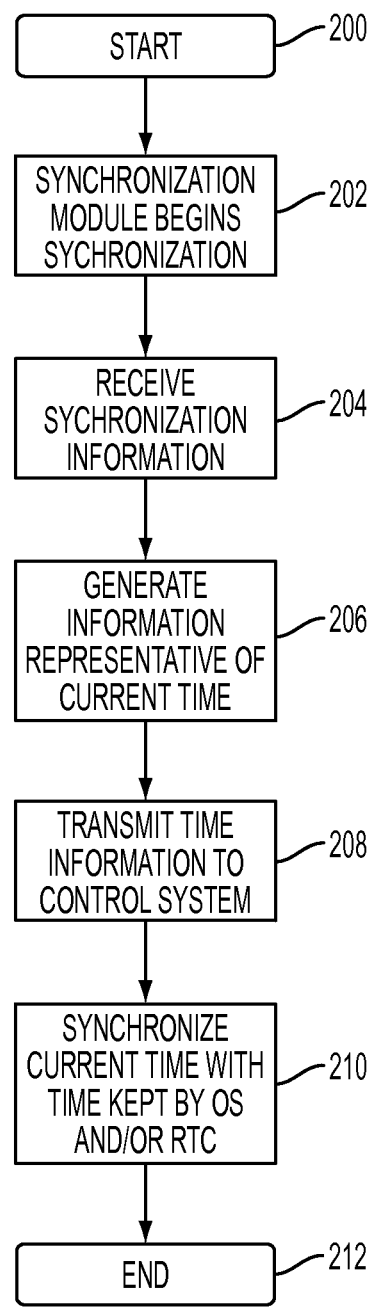
FIG. 8 is a flow chart illustrating steps of a method of updating the time kept by a fuel dispenser control system in accordance with an embodiment of the present invention.

FIG. 8 is a flow chart illustrating steps of a method of updating the time kept by a fuel dispenser control system in accordance with an embodiment of the present invention. The method starts (step 200) when a synchronization module in accordance with embodiments of the present invention begins synchronization (step 202), either independently or as instructed by the control system. At step 204, the synchronization module may receive a carrier wave modulated with synchronization information. For example, where the synchronization module is a radio clock module, the synchronization information may comprise a time code representative of the current time. Also, where the synchronization module is a satellite navigation receiver, the synchronization information may comprise a GPS signal. At step 206, the synchronization module may generate information representative of the current time and may also store this information in memory. At step 208, the synchronization module may transfer this information to the control system. At step 210, the control system may synchronize the time kept by its OS or RTOS with the current time information provided by the synchronization module. Where the control system includes an RTC, the control system may also synchronize the time kept by the RTC with the current time. At step 212, the process ends.

Although the method described with reference to FIG. 8 involves a control system in a fuel dispenser, it will be appreciated that the method may be modified for use with other control systems in a fueling environment. For example, where the synchronization module comprises a satellite navigation receiver, the method may include the additional steps of the receiver generating information representative of a current location of the receiver, the receiver transmitting this information to the control system, and the control system storing the location information in memory and/or transferring this location information to a remote system. Further, where the control system is a site controller, the method may include the additional steps of transmitting the information representative of the current time to other control systems in the fueling environment, such as to fuel dispenser control systems. Those of skill in the art will appreciate that other modifications to the method described in FIG. 8 are within the scope of the present invention.

As should be apparent to those skilled in the art, many advantages are realized by the systems and methods for providing accurate date and time information in and geotracking of various control systems in a fueling environment in accordance with the present invention. For example, use of a radio clock and/or GPS receiver module in accordance with embodiments of the present invention provides a trusted way to obtain date and time information from reliable, independent sources. Further, some embodiments may eliminate the need to use an RTC in certain control systems in the fueling environment. It likewise removes the necessity of human intervention for inputting and/or resetting the current time and for compensating for daylight savings time offsets. Correspondingly, use of a synchronization module as described herein may eliminate fraud by managers, service personnel, auditors, or inspectors who previously were able to manually reset the time at a control system.

Where a GPS receiver module is used, it enables complete geotracking to provide location indicia (such as navigation coordinates) for control systems (and associated components, such as fuel dispensers) in a fueling environment which can be saved and/or reported to another device. As noted above, this information may be used for tracking and cross reference of site data and for maintaining a history of control board movement from dispenser to dispenser. Thus, embodiments of the present invention allow compliance with applicable regulations and may provide new and additional accurate information for diagnostics, data collection, and cloud use.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method for obtaining accurate time information at a fuel dispenser, said method comprising the steps of:
providing a synchronization module in electronic communication with a control system of a fuel dispenser, said control system in operative communication with hydraulics of said fuel dispenser and comprising a memory, said control system further comprising an operating system which maintains a first time;
receiving at said synchronization module a carrier wave modulated with synchronization information;
generating at said synchronization module information representative of a second time; and
transmitting said information representative of said second time to said control system.

2. The method of claim 1, wherein said control system periodically instructs said synchronization module to receive said synchronization information.

3. The method of claim 1, wherein said synchronization information comprises a time code.

4. The method of claim 1, wherein said synchronization module receives a GPS signal.

5. The method of claim 4, further comprising generating at said synchronization module information representative of the location of said synchronization module.

6. The method of claim 5, further comprising transmitting said location information to said control system and storing said location information in said control system memory.

7. The method of claim 1, wherein said control system does not comprise a real-time clock.

8. The method of claim 1, wherein said synchronization module is located at a site controller remote from said fuel dispenser.

9. A fuel dispenser, comprising:
internal fuel flow piping;
a flow meter located along said internal fuel flow piping;
a displacement sensor operatively connected to said flow meter to generate information representative of an amount of fuel passing through said flow meter;
a control system comprising a memory, wherein said control system does not comprise a real-time clock; and
a synchronization module in electronic communication with said control system, said synchronization module comprising at least one antenna configured to receive a carrier wave modulated with synchronization information.

10. The fuel dispenser of claim 9, wherein said control system controls hydraulic components of said fuel dispenser.

11. The fuel dispenser of claim 9, wherein said control system is a CRIND module.

12. The fuel dispenser of claim 9, wherein said synchronization module comprises a radio clock.

13. The fuel dispenser of claim 12, wherein said synchronization information comprises a time code.

14. The fuel dispenser of claim 9, wherein said synchronization module comprises a satellite navigation receiver.

15. The fuel dispenser of claim 14, wherein said synchronization information comprises a GPS signal.

16. The fuel dispenser of claim 15, wherein said synchronization module is configured to generate information representative of a current time and a location of said synchronization module.

17. A method for obtaining accurate time information at a fuel dispenser, said method comprising the steps of:
providing a control system located in said fuel dispenser, said control system comprising a memory and software which maintains a first time;
said control system further comprising a synchronization module, said synchronization module comprising at least one antenna configured to receive a carrier wave modulated with synchronization information;
receiving said carrier wave;
generating information representative of a second time; and
synchronizing said first time with said second time.

18. The method of claim 17, wherein said control system is in electronic communication with a card reader.

19. The method of claim 17, wherein said control system is in operative communication with hydraulics of said fuel dispenser.

20. The method of claim 17, wherein said generating step is performed at said control system.

21. The method of claim 17, wherein said synchronization module comprises a radio clock.

22. The method of claim 21, wherein said synchronization information comprises a time signal emitted by a radio transmitter.

23. The method of claim 17, wherein said synchronization module comprises a satellite navigation receiver.

24. The method of claim 23, further comprising generating information representative of a location of said control system and storing said information in said memory.

* * * * *